United States Patent
Guerra

[15] 3,705,000
[45] Dec. 5, 1972

[54] LIQUID SAMPLE HOLDER FOR A PHOTOMETER

[72] Inventor: John P. Guerra, Buffalo, N.Y.
[73] Assignee: American Optical Corporation, Southbridge, Mass.
[22] Filed: June 1, 1971
[21] Appl. No.: 148,815

[52] U.S. Cl. .................................. 356/246, 350/95
[51] Int. Cl. ..................... G01n 1/10, G02b 21/34
[58] Field of Search ..................... 356/246; 350/95

[56] References Cited
UNITED STATES PATENTS
3,565,537  2/1971  Fielding................................356/246

Primary Examiner—Ronald L. Wibert
Assistant Examiner—V. P. McGraw
Attorney—William C. Nealon, Robert J. Bird, Joel Wall and Jeremiah J. Duggan

[57] ABSTRACT

A unitary liquid sample chamber of injection-molded transparent material defining a collection well and a capillary space.

1 Claim, 4 Drawing Figures

PATENTED DEC 5 1972  3,705,000

INVENTOR

John Guerra

By Robert J Bird
Attorney

LIQUID SAMPLE HOLDER FOR A PHOTOMETER

BACKGROUND OF THE INVENTION

The present invention relates to photometers for colorimetric evaluation of liquid specimens, and more particularly to a liquid sample chamber for such an instrument.

Photometric instruments are used for colorimetry of various liquids, including blood samples. Such instruments of specialized use with blood samples include hemoglobinometers and billirubinometers. An example of a hemoglobinometer in which the present invention may be used is described in U.S. Pat. No. 2,482,650, issued on Sept. 20, 1949 to Morden G. Brown and Harry F. Lundberg. The details of this instrument will not be further described herein except insofar as necessary to an understanding of this invention.

In the Brown and Lundberg patent, the liquid (blood) sample is introduced into the photometer by a sample chamber of three parts, best shown in FIGS. 8 and 9 of the patent. These parts include a lower glass plate defining certain channels, and an upper glass plate which fits on the lower plate to define therewith a capillary chamber of precise thickness. The two plates are held together by a spring clip having a handle by which the plates are inserted into, and removed from, the instrument. The capillary chamber holds the blood sample for photometric analysis. The glass plates are retained and washed between successive used. Their use involves the manipulating of three separate parts in addition to the blood sample itself.

SUMMARY OF THE INVENTION

It is an object of the present invention to provide one-piece liquid sample holder combining a sample collection well and a capillary chamber for photometric analysis.

Briefly, the present invention includes a one-piece molded plastic liquid sample holder defining a collection well for the introduction of a sample and an adjacent capillary chamber for the flow thereinto of sample from the well. The capillary chamber is of a certain controlled thickness to enable accurate photometric analysis of the liquid sample.

DRAWING

Further objects, advantages, and features of this invention will become apparent from the following description of one embodiment thereof, given in connection with the accompanying drawing.

DESCRIPTION

Figure 1:
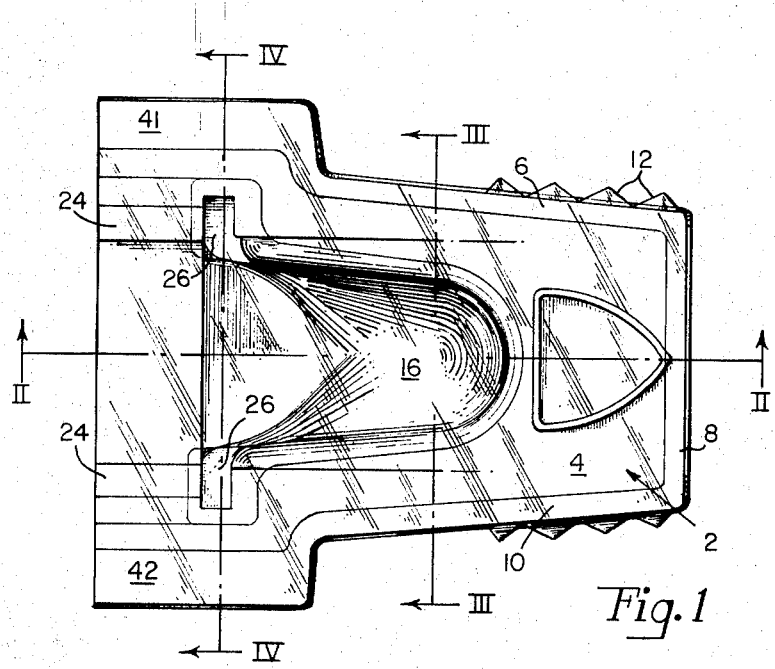
FIG. 1 is a top view of a liquid sample holder according to the present invention.

Referring now to FIG. 1, a liquid sample holder is generally indicated at 2 and is preferably a one-piece injection molding of a transparent plastic material. Though the holder 2 is a single piece, various portions will be assigned numbers in the following description for illustration. Holder 2 includes a web member 4 which forms its top surface and flange members 6, 8, and 10 depending from web 4 and forming the side and end walls supporting web member 4. Side walls 6 and 10 include serrations 12 for gripping the side members for ease in handling of the liquid sampling holder. Web member 4 is somewhat U-shaped having arms 41 and 42 extending longitudinally from its central portion.

Figure 2:
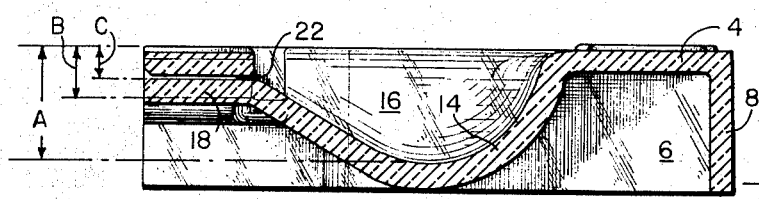
FIG. 2 is a sectional view taken along the line II—II of FIG. 1.
Figure 3:
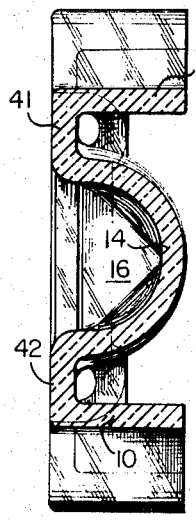
FIG. 3 is a sectional view taken along the lines III—III of FIG. 1.

Referring now to FIGS. 2 and 3, web member 4 is formed to include a recessed portion 14 defining a collection well 16 to contain a sample of liquid to be tested. Well 16 is of a depth A for web 4. A horizontally extending plate member 18 is integral with and extends from recessed portion 14 at a depth C from web 4.

Figure 4:
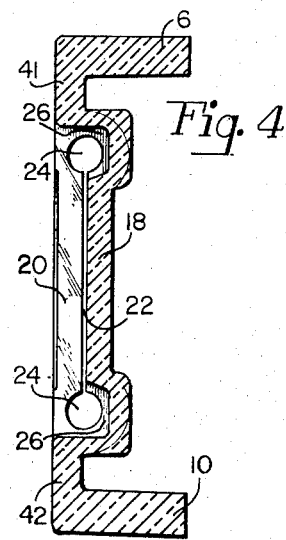
FIG. 4 is a sectional view taken along the lines IV—IV of FIG. 1.

Referring now to FIG. 4, looking in the direction of arrows IV—IV from well 16, a cover plate 20 is shown positioned over plate member 18 and extending between arms 41 and 42. Plate member 18 and cover plate 20 are separated by a thin capillary chamber 22 substantially coextensive with plates 18 and 20. Capillary chamber 22 is 0.006 inches thick in an exemplary embodiment of this invention, though of course this dimension is not limiting.

A pair of cylindrical apertures or overflow conduits 24 extend from collection well 16, between plates 18 and 20 at each end thereof, through to the end of holder 2. These overflow conduits are larger in diameter than the capillary chamber 22 and serve to collect surplus sample in chamber 22. Overflow conduits 24 connect at their inner ends with overflow wells 26, each of a depth B which is intermediate the depth A of collection well 16 and depth C of plate 18.

In use, liquid sample is introduced to the holder 2 in collection well 16. After any required treatment, the holder 2 may be tilted or the sample otherwise brought into contact with the edge of the capillary space, designated at 28. As the sample is fed at edge 28, capillary action draws it into the capillary chamber 22. Since the chamber is open at its opposite end and on each side, communicating with overflow conduits 24, the chamber 22 is filled completely. Without these openings, trapped air would not permit the complete filling of the chamber. Surplus sample overflows from the chamber 22 into the overflow conduits 24 and, by means of overflow wells 26, will flow back into collection chamber 16 rather than spilling out at the end of the holder.

One particular application of this invention is for use with a sample of blood in a hemoglobinometer. Whole blood has a cloudy appearance and is not perfectly transparent even in thin layers. The process of hemolyzation ruptures the envelopes of the individual blood cells which cause this turbidity, and allows the hemoglobin to go into a uniform solution which is transparent. This position of hemolyzation is performed on the blood sample within the collection well 16 prior to the introduction of the sample into the capillary chamber. Thus, collection well 16 serves a double function as a sample collector and a sample treatment station for such samples like blood that require treatment.

It may occur to others to make modifications of this invention which will lie within its concept and scope and not constitute a departure. Accordingly, it is intended that the invention be not limited by the details of its description but only by the following claims.

What is claimed is:

1. A one-piece liquid sample holder for treatment and photometric analysis of a liquid sample, including:

a body member defining an open-topped liquid sample collection well for holding a quantity of a sample liquid, said well being defined by a bottom wall and side walls, a flat capillary chamber defined by a pair of spaced parallel transparent plates, said chamber opening through the walls defining said collection well at a position above the bottom of said well, an overflow conduit in mutual communication with the collection well and the capillary chamber, said well arranged too hold a quantity of liquid sample out of communication with said capillary chamber but to deliver a quantity of said sample to the capillary chamber when the holder is tilted, said capillary chamber effective by capillary action with the liquid sample to draw said sample thereinto for photometric analysis.

* * * * *